United States Patent
Weissert

(10) Patent No.: US 7,278,654 B2
(45) Date of Patent: Oct. 9, 2007

(54) STIFFENING FRAME FOR AN INTEGRAL TETHER AND TEARSTOP IN AN AIR BAG DOOR

(75) Inventor: Ulrich Weissert, Rochester, MI (US)

(73) Assignee: Collins & Aikman Products Co., Southfield, MI (US)

( * ) Notice: Subject to any disclaimer, the term of this patent is extended or adjusted under 35 U.S.C. 154(b) by 412 days.

(21) Appl. No.: 10/768,353

(22) Filed: Jan. 30, 2004

(65) Prior Publication Data
US 2005/0167953 A1 Aug. 4, 2005

(51) Int. Cl.
*B60R 21/20* (2006.01)

(52) U.S. Cl. ............... 280/728.3; 280/732; 280/733

(58) Field of Classification Search ............ 280/728.2, 280/728.3, 732, 733
See application file for complete search history.

(56) References Cited

U.S. PATENT DOCUMENTS

| | | | | |
|---|---|---|---|---|
| 5,211,421 | A | 5/1993 | Catron et al. ............... 280/728 |
| 5,332,257 | A | 7/1994 | Rogers et al. ........... 280/728 B |
| 5,451,075 | A * | 9/1995 | Parker et al. ............ 280/728.3 |
| 5,474,324 | A * | 12/1995 | Bentley et al. .......... 280/728.3 |
| 5,533,746 | A | 7/1996 | Whited .................... 280/728.2 |
| 5,564,731 | A | 10/1996 | Gallagher et al. ....... 280/728.3 |
| 5,569,959 | A * | 10/1996 | Cooper et al. ........... 280/728.3 |
| 5,685,930 | A | 11/1997 | Gallagher et al. ......... 156/73.1 |
| 5,765,862 | A | 6/1998 | Bentley ................... 280/728.3 |
| 5,804,121 | A | 9/1998 | Gallagher et al. .......... 264/250 |
| 5,902,428 | A | 5/1999 | Gallagher et al. ......... 156/73.1 |
| 5,975,563 | A | 11/1999 | Gallagher et al. ....... 280/728.3 |
| 6,402,189 | B1 | 6/2002 | Gray et al. .............. 280/728.3 |
| 6,533,314 | B2 | 3/2003 | Merrifield et al. ....... 280/728.3 |
| 6,595,543 | B2 * | 7/2003 | Desprez ................... 280/728.3 |
| 6,709,007 | B2 * | 3/2004 | Gray et al. .............. 280/728.3 |
| 6,753,057 | B1 * | 6/2004 | Gardner, Jr. ................. 428/43 |
| 6,955,376 | B1 * | 10/2005 | Labrie et al. ............ 280/728.3 |
| 6,976,701 | B2 * | 12/2005 | Gray et al. .............. 280/728.3 |
| 7,029,027 | B2 * | 4/2006 | Gray et al. .............. 280/728.3 |
| 2003/0184058 | A1 | 10/2003 | Gray et al. .............. 280/728.3 |
| 2003/0209892 | A1 * | 11/2003 | Hier et al. .................. 280/732 |

FOREIGN PATENT DOCUMENTS

WO    WO 03/035435    5/2003

* cited by examiner

*Primary Examiner*—Paul N. Dickson
*Assistant Examiner*—Toan C. To
(74) *Attorney, Agent, or Firm*—Grossman, Tucker, Perreault & Pfleger, PLLC

(57) ABSTRACT

An air bag door construction for air bag deployment comprises a trim panel and air bag door of unitary construction, at least a portion of the door defined by an area of reduced cross-section outlining at least a portion of the periphery thereof. One or more tethers are formed in the panel, outlined by an area of reduced cross-section, preferably in a dovetail shape which does not direct the propagation of tearing into the tether. A tear stop may be formed at the ends of the tether. The improvement comprises a stiffening frame that is attached to the backside of the panel just outboard of the air bag door periphery but not located across the tethers to improve deployment performance.

10 Claims, 2 Drawing Sheets

STIFFENING FRAME FOR AN INTEGRAL TETHER AND TEARSTOP IN AN AIR BAG DOOR

FIELD OF THE INVENTION

The present invention relates to air bag door constructions for vehicles including the hinging and retention of the door through the use of a stiffening frame for an integral tether design that provides an integral tear stop, and more particularly, to the improvement in deployment performance by attaching areas surrounding the tether to a stiffening frame.

BACKGROUND OF THE INVENTION

Nearly all motor vehicles today are provided with inflatable restraint systems to protect both the driver and passengers in the event of a collision. The air bag system for the passenger side of the vehicle generally includes an inflator and reaction canister located behind the instrument panel and the air bag inflates through an opening in the panel through which the air bag deploys. That opening may be covered by a generally rectangular shaped door that is flush-mounted in the opening and is moved out of the way on a hinge or tethers by the deploying air bag. In newer applications, the door that covers the opening may be "invisible" to the occupants of the vehicle, that is, hidden behind a surface covering of skin and foam which is pre-weakened by a groove formed on the backside of the skin layer to allow a predictable tearing of the skin. A separate door substrate may be located beneath the skin and foam layers and is hinged or tethered to the instrument panel or canister to control door opening.

Vehicles such as small trucks, SUV's and small to medium sized cars often will use a hard panel construction, i.e., without a separate soft skin and padded foam layer, to reduce cost. In these cases, a separate air bag door, instrument panel and door chute may be assembled over the canister. To control the path of the air bag as it expands, a deployment chute transitions the space between the canister where the bag is stored and the back of the air bag door to assure that the bag does not expand in an undesirable direction. Use of a hard door separate from the remainder of the instrument panel may allow replacement of only the door portion after a low speed deployment, as the remainder of the instrument panel may not be damaged. In still other applications, the hard instrument panel and door may be formed of unitary construction with a pre-weakened seam of reduced cross-section formed on the underside of the panel, outlining at least a portion of the periphery of the air bag door. Hinges, tethers, reinforcements and chutes may then be post-attached to the molded hard panel. This unitary construction is preferred as aesthetics are enhanced (no visible seam) and cost is reduced (a single molding rather than multiple components assembled together). Optionally, a substrate and air bag door portion molded of unitary construction may be covered with a skin layer or skin and foam layer to provide a soft trim panel with hidden air bar door.

Additionally, it is known in the art to use both hinges and tethers to control the opening and travel of the door or door substrate. In U.S. Pat. Nos. 5,685,930; 5,564,731; 5,804,121; 5,902,428 and 5,975,563 to Gallagher, et al. and commonly assigned to the assignee of the present invention and included herein by reference, a molded motor vehicle instrument panel made of thermoplastic material having an integral air bag deployment door for a passenger side air bag that is defined by a tear seam and normally retained by a hinge flange is disclosed.

In U.S. Pat. Nos. 5,685,930 and 5,902,428, upon deployment the door is retained by a supplemental flexible tethering hinge which is formed separately from the panel and attached by welding or an adhesive. The supplemental tethering hinge contains a loop or fold 63 as slack to let the door separate and move controllably away from the instrument panel to allow the bag to expand through the opening.

In U.S. Pat. Nos. 5,564,731 and 5,975,563 the flexible tethering hinge is described as being of sheet material, thermosetting, thermoplastic, metal mesh or woven fabric of plastic or natural fibers and attached by mechanical fasteners or hot staked bosses on the inner side of the door portion.

U.S. Pat. Nos. 5,975,563 and 5,804,121 are directed at an integral mounting hinge/flange on which is formed a bonded layer of a second plastic material on one side of the flange as well as and on the inner side of a potentially frangible portion of the door. The second plastic material has the physical characteristic of remaining ductile at low temperature at which the instrument panel plastic material bercomes brittle, and as a result, the bonded layer forms a tether to retain the door in a controlled manner as it separates from the instrument panel when the air bag is deployed.

In U.S. Pat. No. 5,765,862 to Autoliv ASP, Inc., an inflatable air bag assembly mounted in a rectangular opening in the vehicle instrument panel is disclosed having bracket means, a plurality of thermoplastic resin fasteners and an integrally formed tether support bar 18 for a tether 20 that is connected between the door 14 and a bracket 22, on the air bag module 16.

U.S. Pat. No. 5,533,746 to Morton International recites a cover for covering an opening in a panel adjacent to an air bag inflation system comprising a tether attachment element having a first portion sandwiched between said inner (metal) and outer substrates and a second portion exposed for attachment to a tether, and at least one tether having a loop at an outer end portion of said tether attachment element and having an inner end portion adapted for fixed attachment to limit the amount of movement of said cover away from the opening deployment of the air bag inflation system. The tether may comprise a loop and the attachment element may be an elongated metal rod. The attachment element (rod) has a series of "U-shapes" that extend between the door inner and outer back to a flexible tether that is looped in its undeployed condition.

U.S. Pat. No. 5,332,257, also to Morton International, discloses a tether having first and second ends, the first end being secured to said module cover (on the B-side), and the second end forming a loop. A retainer rod extends through said loop and a channel encloses said retainer rod and loop in a fixed position to anchor said tether.

U.S. Pat. No. 5,211,421 to G.M., discloses a tether that is on the A-side of an air bag door, between substrate and foam layer which is fastened to a bracket on the canister.

All of these references use numerous components, particularly separate tethers, in an attempt to accomplish their objectives resulting in added material and manufacturing costs. Separate door, chute, tether, fasteners and reinforcement materials are combined with a myriad of attachment processes to form an assembly that may be installed in the instrument panel.

It is therefore an object of this invention to provide a tether for an air bag door that is integrally formed within the unitary molding of the door and adjoining panel to retain the air bag door upon air bag deployment, wherein an improved construction for the functioning of the tether comprises a stiffening frame or deployment chute attached to the backside of the trim panel just outboard of the air bag door tear seam (or area of reduced cross-section).

It is a further object of the present invention to provide a tear seam of reduced cross-section which defines at least a portion of the air bag door as well as the integrally formed tether(s), which interacts with the attached stiffening frame.

It is a still further object of this invention to provide a tether that includes a tear stop which prevents the air bag door from completely separating from the adjacent panel upon air bag deployment, which interacts with the attached stiffening frame.

It is a still further object of the present invention to outline the aforementioned tether and tear stops generally in the shape of a "U", preferably as a dovetail in which the base of the "U" is wider than the open end of the "U", so that the propagation of tearing along the area of reduced cross-section do not converge into the area forming the tether.

It is therefore an object of the present invention to provide an improved construction for the functioning of the tether of the present invention which comprises a stiffening frame or deployment chute attached to the backside of the trim panel just outboard of the air bag door tear seam (or area of reduced cross-section). The means of attachment of the stiffening frame is constructed so as not to engage with the tether to allow for additional displacement of the door from the panel.

These and other objects, advantages and features of the present invention will become more apparent form the following description and accompanying drawings.

SUMMARY OF THE INVENTION

The present invention provides an improvement to an air bag door construction for air bag deployment comprising a hard instrument panel having an integrally formed air bag door of unitary construction, said air bag door having an area of reduced cross-section outlining at least a portion of the periphery thereof. A tether is included wherein the tether is bounded by an area of reduced cross-section in the shape of at least a portion of a "U", but preferably 1 or more dovetail or "U-shaped" areas of reduced cross-section, formed along an edge where the air bag door is designed to hinge. Upon air bag deployment, said air bag door may at least partially detach from said instrument panel and be retained by the tether. The tearing of the area of reduced cross-section that forms the tether terminates at a tear stop which is formed by at least one of the legs of the open end of a "U". The preferably dovetail shape outlining the tether insures that the propagation of tearing along the area of reduced cross-section does not converge into the area forming the tether. The improvement comprises providing additional rigidity to the backside of the trim panel in the area of the air bag door.

In an alternative embodiment, the present invention may comprise a molded instrument panel made of a commercially available plastic material which has an integrally formed air bag door of unitary construction and which has a skin layer, or optionally a skin layer and foam layer, covering the molded panel and integrally formed door. At least a portion of the air bag door periphery is defined by a weakened tear seam which may be of reduced cross-section, formed or cut into the underside of the instrument panel, or alternatively may comprise a series of shallow holes or slots defining the air bag door shape. One or more tethers including one or more tear stops is formed along one edge of the integrally formed air bag door, the tether outlined by an area of reduced cross-section which forms the shape of a "U". Preferably the "U" is a curvilinear dovetail shape having the base of the "U" wider than the open end of the "U", so that that the propagation of tearing along the area of reduced cross-section does not converge into the area forming the tether. Each leg of the open end of the "U" forms a tear stop for the tether to retain the air bag door to the adjoining trim panel. Thus, a simple one-piece tether design for air bag deployment is provided with no visible seam for an air bag door and having no opening formed until the air bag deploys. The panel is substantially comprised of one major plastic molded component, which may be attached to a deployment chute which directs the air bag against the back side of the air bag door.

It has been found that the functioning of the tethers noted above may be improved by providing additional rigidity to the backside of the trim panel in the area of the air bag door. More specifically, a stiffening frame may preferably be attached to the backside of the trim panel in an area just outboard of the tear seam. Further, it has been found that improved tether performance is achieved when the stiffening frame is attached to the backside of the panel essentially on all sides of the door, but that no attachment is made in the areas that will form the tethers. Attachment of the stiffening frame to the backside of the panel may be accomplished by any of the methods known to those skilled in the art, including but not limited to, adhesive, mechanical and autogenic welding, but most preferably by vibration welding.

PREFERRED EMBODIMENTS

Figure 1:
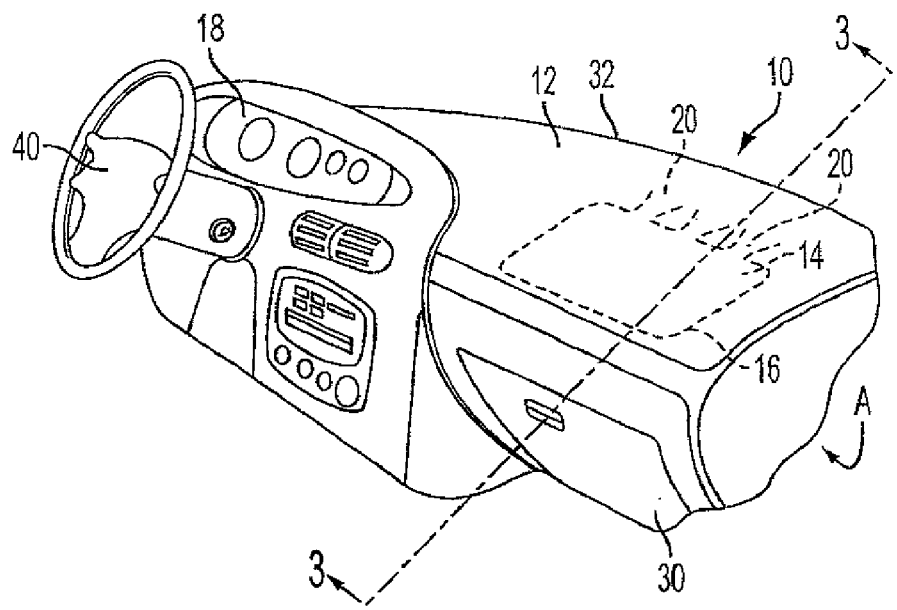
FIG. 1 is a perspective view of a motor vehicle instrument panel including an air bag door with a tether according to the present invention as installed in a motor vehicle over an air bag system.

The present invention addresses the deficiencies of the prior art by providing an improvement to a tether for an invisible air bag door preferably formed in a hard plastic instrument panel wherein the tether and at least a portion of the perimeter of the integral air bag door are formed by an area of reduced cross-section in the panel. For an invisible or hidden air bag door, the area of reduced cross-section may be formed in the underside of the panel creating a frangible marginal edge along which the door may at least partially separate from the panel. In another embodiment, the area of reduced cross-section may be formed on the top or front side of the panel to form a style line as well as a frangible marginal edge for tearing. In a still further embodiment, either of the afore-mentioned constructions may be covered by a layer of skin, and optionally, by a layer of foam between the skin and panel. The tether thus acts to retain the air bag door from completely separating from the panel.

Turning to a description of the invention in connection with the Figures, for elements common to the various embodiments of the invention, the numerical reference character between the embodiments is held constant, but distinguished by the addition of an alphanumeric character to the existing numerical reference character. In other words, an element referenced at 10 in the first embodiment is correspondingly referenced at 10A, 10B and so forth on subsequent embodiments. Thus, where an embodiment description uses a reference character to refer to an element, the reference character applies equally, as distinguished by alphanumeric character, to the other embodiments where the element is common. Furthermore, it should be appreciated that the various features of all of the preferred embodiments herein may be used between such embodiments, in the sense that each preferred embodiment may preferably incorporate features of another particular preferred embodiment.

Referring to FIG. 1, there is illustrated a hard plastic molded instrument panel 10 as installed in a motor vehicle. The instrument panel 10 contains an instrument cluster 18 on the driver's side, a glove box 30, steering wheel assembly 40 and an air bag deployment door 14 of desired shape, in this case rectangular, on the passenger's side whose entire or partial perimeter is defined by a frangible tear seam 16 molded or cut into the underside of the instrument panel. The tear seam is preferably invisible to the occupants of the vehicle for reasons of aesthetics, and thus is shown in FIG. 1 by dashed lines. Alternatively, the tear seam may be formed in the top or Class A surface of the panel, or alternately in both the top and bottom surfaces of the molded panel. The panel is generally molded of a somewhat ductile plastic and the frangible tear seam 16 represents a thinned area of reduced cross-section which may include a series of shallow holes or slots which fracture due to the pressure of the inflating air bag, allowing the air bag door to at least partially break loose from the instrument panel predictably and without fragmentation.

Figure 2:
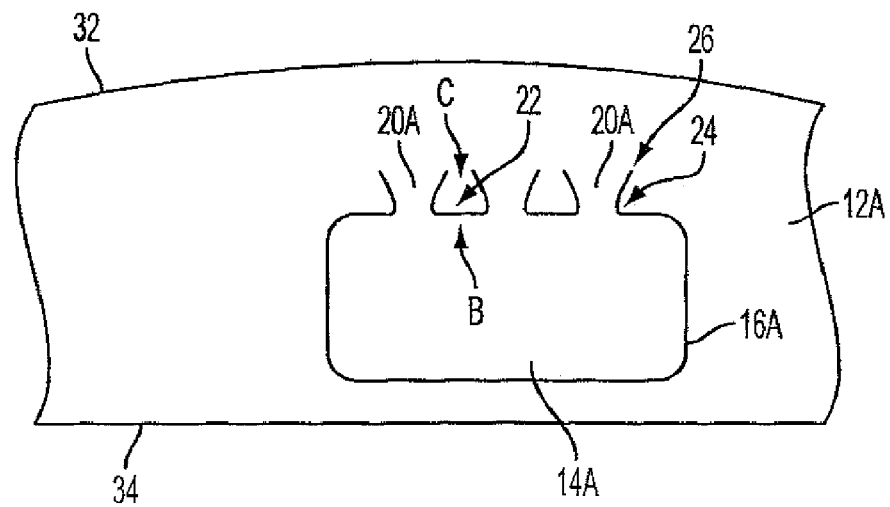
FIG. 2 is a partial plan view of the backside of the instrument panel of FIG. 1 in the area of the air bag door taken in the direction of Arrow A.

The area of reduced cross-section which forms the frangible tear seam 16 also forms one or more integral tethers 20 along an edge of the door, preferably the edge which is designed to allow the door to hinge from the panel 12. FIG. 2 is a partial view of the backside of the instrument panel of FIG. 1, from beneath the panel in the direction of Arrow A. For reference purposes, the windshield edge of the panel is denoted as 32 and the lower, or knee edge, of the panel as 34. FIG. 2 illustrates the preferred shape and position of the tethers 20A which are outlined by areas of reduced cross-section 16A formed in the panel 12A. To allow controllable tearing of the door 14A from the panel 12A, but at least partial retention of the door 14A from completely separating from the panel 12A, the area of reduced cross-section 16A is formed in a curvilinear pattern preferably in the form of a dovetail or "U-shape". Thus, as shown in FIG. 2, the tether 20A is formed between, or outlined by "U-shapes" 22 or portions of "U-shapes" of reduced cross-section cut or formed in the panel surface, preferably at an edge about which the door is designed to hinge. More preferably, the "U" or dovetail shape 22 is formed with the base of the "U" (referenced as B) wider than the open end of the "U" (referenced as C) and has a smooth curvilinear shape containing no sharp corners. This assures that the tearing along the area of the reduced cross-section 16A will follow the preferred shape and not deviate, possibly resulting in complete separation of the door.

As can be appreciated from the above, it is preferred that the area of reduced cross section that define the perimeter of the airbag door 14A as well as the preferred "U" or dovetail shape 22 is configured so that that the propagation of tearing along the area of reduced cross-section 16A does not converge into the area 20A forming the tether. Therefore, the invention herein uniquely provides a weakening pattern in a trim panel 12A (substrate or skin/foam/substrate) that ensures that tearing will stop and that a tether 22 upon air bag deployment is formed to prevent complete separation of the airbag door 14A from the trim panel 12A.

In FIG. 2, for clarity, the area of reduced cross-section 16A is shown as a groove outlining the perimeter of the door and the tethers. In other embodiments, the area of reduced cross-section 16A may be intermittent and comprise holes or slots formed partially through or completely through the panel 12A.

At each end of the door 14A, a curved section 24 resembling one side of the "U-shape" 22 preferably is formed to define the outline of tearing of the door 14A from the panel 12A. The leg of the side of the "U-shape" comprises an area of reduced cross-section which is terminated to form a tear stop 26. The tear stop 26 may also comprise a keyhole or other shape as described in U.S. Pat. No. 6,402,189, which is commonly assigned to the assignee of the present invention and included herein by reference, to prevent the propagation of tearing into an undesirable area of the panel. The other side of tether 20A is formed by a portion of another "U-shape" 22, thus outlining tether 20A with areas of reduced cross-section which comprise portions of a "U-shape" 22. Again, it is preferably that the curved section 24 is configured so that it does not converge into the tether region 20A.

The area of reduced cross-section 16A which forms the at least partial perimeter of the air bag door 14A and the tethers 20A, may be formed on either the first surface (top) or under surface of the molded panel. FIG. 2 shows the tear seam 16A formed in the undersurface by one or a combination of processes, including but not limited to, laser scoring, sonic knife, heated knife, or by forming the seam as part of the panel molding process through the inclusion of raised mold segments (blades) in the mold surface which project at least partially into the mold and are encapsulated by the flow of polymer around these blades, forming the area of reduced cross-section. The area of reduced cross-section 16A which acts as a tear seam for the air bag door 14A and outlines the tethers 20A may be a groove, intermittent slots or holes, including partial perforations, of a variety of shapes as described in U.S. Pat. No. 6,402,189, entitled "Air Bag Door And Method Of Making Such", commonly assigned to the assignee of the present invention and included herein by reference. In the embodiment where a skin layer or skin and foam layer covers the panel substrate, the holes or slots may penetrate completely through the panel substrate as their presence will be hidden by the covering layer(s). In those cases, the holes or slots may even extend into the skin and foam layers as described in U.S. patent application Ser. No. 10/373,332 entitled "Preweakening Of Fabric Covered Air Bag Doors", commonly assigned to the assignee of the present invention and included herein by reference. In addition, the shape of the tear seam or area of reduced cross-section that forms at least a portion of the periphery outlining the air bag door may be in the shape of the following, including but not limited to, an "I", "U", "H", "C", and "X".

Various plastic materials may be molded to form both the instrument panel with integral air bag door of unitary construction, including, but not limited to, acrylonitrile-butadiene-styrene, polycarbonate, polyurethane, polyamide, styrene maleic anhydride, polypropylene, polyolefin, thermoplastic olefin, thermoplastic elastomer, polyphenylene oxide and combinations thereof.

Figure 3:
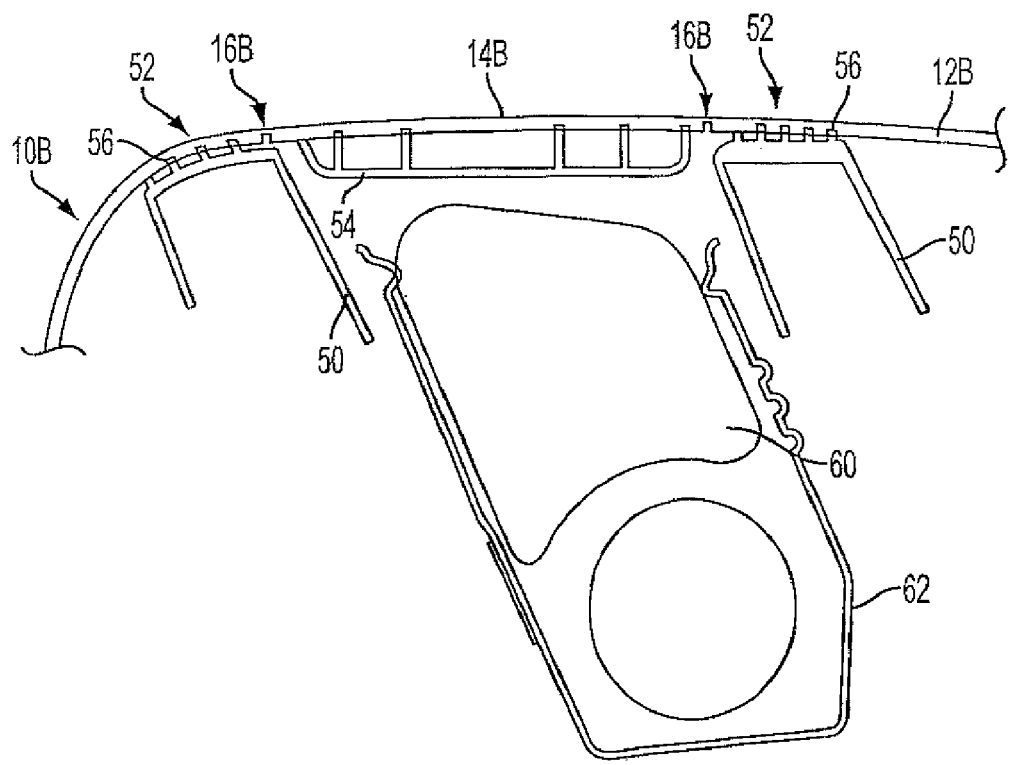
FIG. 3 is a sectional view of the panel of FIG. 1 taken along line 3-3 showing the attachment of the stiffening frame of the present invention.

It has been found that for improved tether performance, it is preferable to stiffen the area around the periphery of the air bag in order to encourage fracture of the door from the surrounding panel at the tear seam. This may be accomplished through the incorporation of a stiffening frame. As shown in FIG. 3, a downstanding flange or flanges 50, preferably in the form of a frame may be attached to the underside of the panel 12B in an area 52 just outboard of the tear seam 16B that forms at least a portion of the periphery of the air bag door 14B. This flange or frame 50 may further comprise the deployment chute that directs the air bag 60 from the canister 62 against the backside of the air bag door 14B. As shown in FIG. 3, the backside of the air bag door 14B may also be reinforced with a reaction plate 54 that aids in directing the force of deployment to the tear seam or area of reduced cross-section 16B. Optionally, a reaction plate may not be used. The flange, frame or chute 50 may be of unitary construction or multiple sections, attached to the backside of the trim panel by any of a number of methods well known to those skilled in the art, including but not limited to, adhesive, mechanical or plastic welding techniques such as, ultrasonic, vibration, induction, hot plate, hot staking, electromagnetic, radiation, microwave, and radio frequency. Preferably, the frame or chute 50 is attached to the backside of the trim panel 12B in an area just outboard of the tear seam 16B by vibration welding, wherein raised ribs 56 or protrusions formed in either the panel 12B underside or frame 50 topside are melted into the opposing surface.

Figure 4:
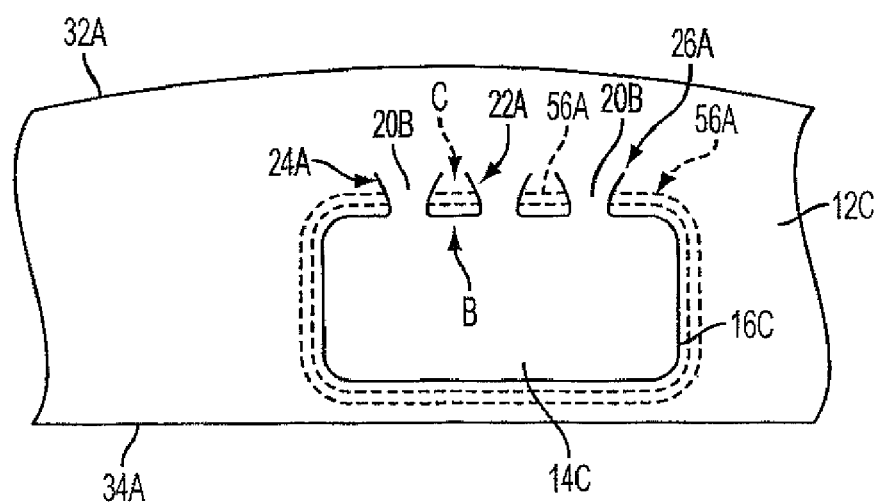
FIG. 4 is a partial view of the backside of the instrument panel of FIG. 1 in the area of the airbag door taken in the direction of Arrow A showing the area of attachment of the stiffening frame to the panel.

For the tether of the present invention, it has been found that performance is enhanced if no attachment is made to the underside of the panel 12B in the region of the tether 20B. This is shown in FIG. 4, where the raised welding ribs 56A between the frame 50 and panel 12B backside in FIG. 3, extend around much of the periphery (as defined by the area of reduced cross-section or tear seam 16C) of the air bag door 14C just outboard of the tear seam 16C, but do not extend across the area which forms the underside of the tether 20B. Thus the door 14C and the tether 20B can hinge open and move in a controlled fashion to displace the door 14C from the panel 12C. Fracturing of the tear seam 16C that forms at least a portion of the door periphery and formation of the tether 20B is directed by the tear seam 16C and tear stops 26A. A stiffening frame construction which also forms the deployment chute for an air bag is disclosed in U.S. application Ser. No. 10/286,251 entitled "Controlled Tether Arrangement For An Airbag", commonly assigned to the assignee of the present invention and included herein by reference.

Thus the tether and tear stop constructions disclosed herein when combined with a molded instrument panel and integrally formed air bag door of unitary construction, and attached to a stiffening frame except in the areas where the tethers are formed, provide a unique and reliable control mechanism for an air bag door system, resulting in reduced assembly and improved manufacturing, as well as controlled deployment performance. Further, the invention is also useful in conjunction with other trim components of a vehicle where an air bag may be stored for protecting occupants.

This description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

What is claimed is:

1. In an air bag door formed as a unitary portion of a panel, said panel comprising a molded plastic substrate, the air bag door having a perimeter at least partially defined by a tear seam, wherein the tear seam also forms one or more tethers and tear stops for said air bag door, wherein the improvement comprises a stiffening frame attached to said panel, outboard of said air bag door perimeter, wherein said attachment of said stiffening frame and said panel is not located across said one or more tethers, wherein said air bag door and said panel are covered with a flexible skin outer layer and wherein said air bag door and said panel include a foam layer between said flexible skin layer and said panel and said door.

2. The air bag door of claim 1 wherein said tear seam comprises an area of reduced cross-section.

3. The air bag door of claim 1 wherein said one or more tethers and tear stops are formed to act as a hinge.

4. The air bag door of claim 1 wherein the one or more tethers are outlined by areas of reduced cross-section formed in the shape of all or a portion of a "U" wherein the base of the "U" is wider than the open end of the "U".

5. The air bag door of claim 1 wherein said stiffening frame is attached to said panel by vibration welding.

6. The airbag door of claim 1 wherein said stiffening frame comprises a deployment chute.

7. An air bag door construction for air bag deployment comprising: a trim panel having an integrally formed air bag door of unitary construction, said air bag door having an area of reduced cross-section outlining at least a portion of the periphery, wherein said area of reduced cross-section forms a tear seam for at least partial separation of said door from said panel upon air bag deployment, and one or more tethers outlined by an area of reduced cross-section adjacent a portion of the periphery of said door, wherein the improvement comprises a stiffening frame attached to said panel, outboard of said air bag door periphery, wherein said attachment of said stiffening frame and said panel is not located across said one or more tethers.

8. The trim panel of claim 7, wherein said panel is a panel of molded thermoplastic.

9. The trim panel of claim 7 wherein said panel is covered with a flexible skin outer layer.

10. The trim panel of claim 7 wherein said panel includes a foam layer underlying said skin outer layer.

* * * * *